United States Patent [19]

Rivoallan

[11] Patent Number: 5,707,564
[45] Date of Patent: Jan. 13, 1998

[54] METHOD FOR THE MANUFACTURE OF WIRES STRETCHED ACCORDING TO A PREDETERMINED PROFILE

[75] Inventor: Loïc Rivoallan, Kermoroc'h, France

[73] Assignee: France Telecom, Paris, France

[21] Appl. No.: 563,672

[22] Filed: Nov. 28, 1995

[30] Foreign Application Priority Data

Nov. 28, 1994 [FR] France ............... 94 14236

[51] Int. Cl.[6] .................................................. B29D 11/00
[52] U.S. Cl. .......................... 264/1.24; 65/435; 65/475
[58] Field of Search ............................ 264/1.24, 1.28, 264/1.29; 65/435, 475

[56] References Cited

U.S. PATENT DOCUMENTS 4,765,816   8/1988   Bjornlie et al. .

FOREIGN PATENT DOCUMENTS 0148569   7/1985   European Pat. Off. .
0369329   5/1990   European Pat. Off. .
63-303304  12/1988  Japan ........................... 264/1.24

OTHER PUBLICATIONS

R.P. Kenny et al., *Control of Optical Fibre Taper Shape*, Electronics Letters, vol. 27, No. 18, Aug. 1991.

*Primary Examiner*—Mathieu D. Vargot
*Attorney, Agent, or Firm*—Nilles & Nilles SC

[57] ABSTRACT

A method for the controlled stretching of one or more optical fibers according to a desired profile and a device for its implementation. The method includes several steps. In these steps, a speed $V_e = dx_e/dt$ of flow of the fiber entering the heating chamber is laid down, a relationship f of variation of the diameter $D_s$ of the fiber during exit from the heating chamber is chosen such that $D_s = f(x_s)$ wherein $x_s$ represents the positions, variable in time, of a point on the fiber during exit from the heating chamber, successive stretching operations are performed on the fiber to modify, each time, the diameter $D_s$ of the fiber during exit from the heating chamber, so as to follow the profile defined by the relationship f of variation. The method has application to the making of optic fiber devices.

12 Claims, 5 Drawing Sheets

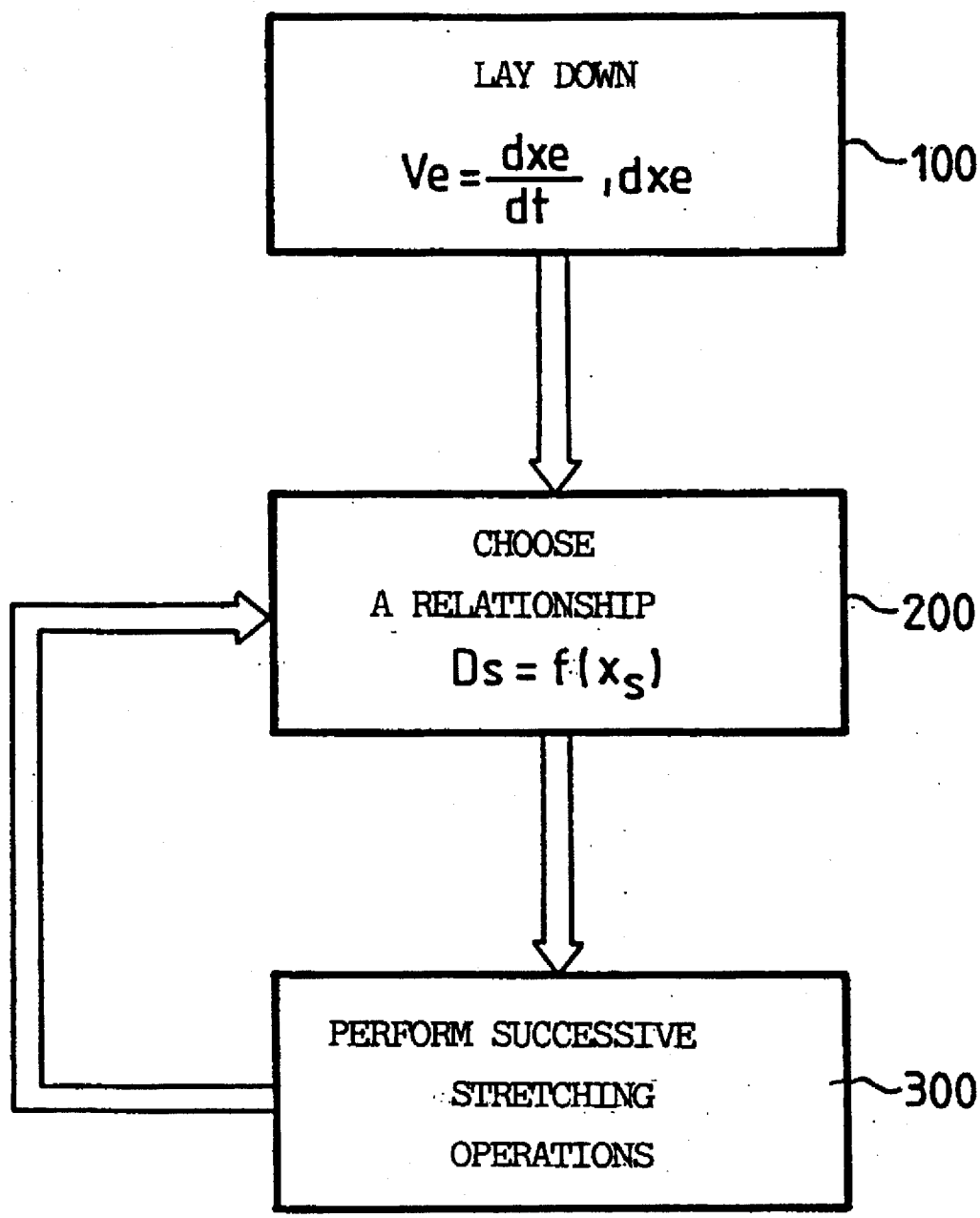
FIG_1

FIG_2
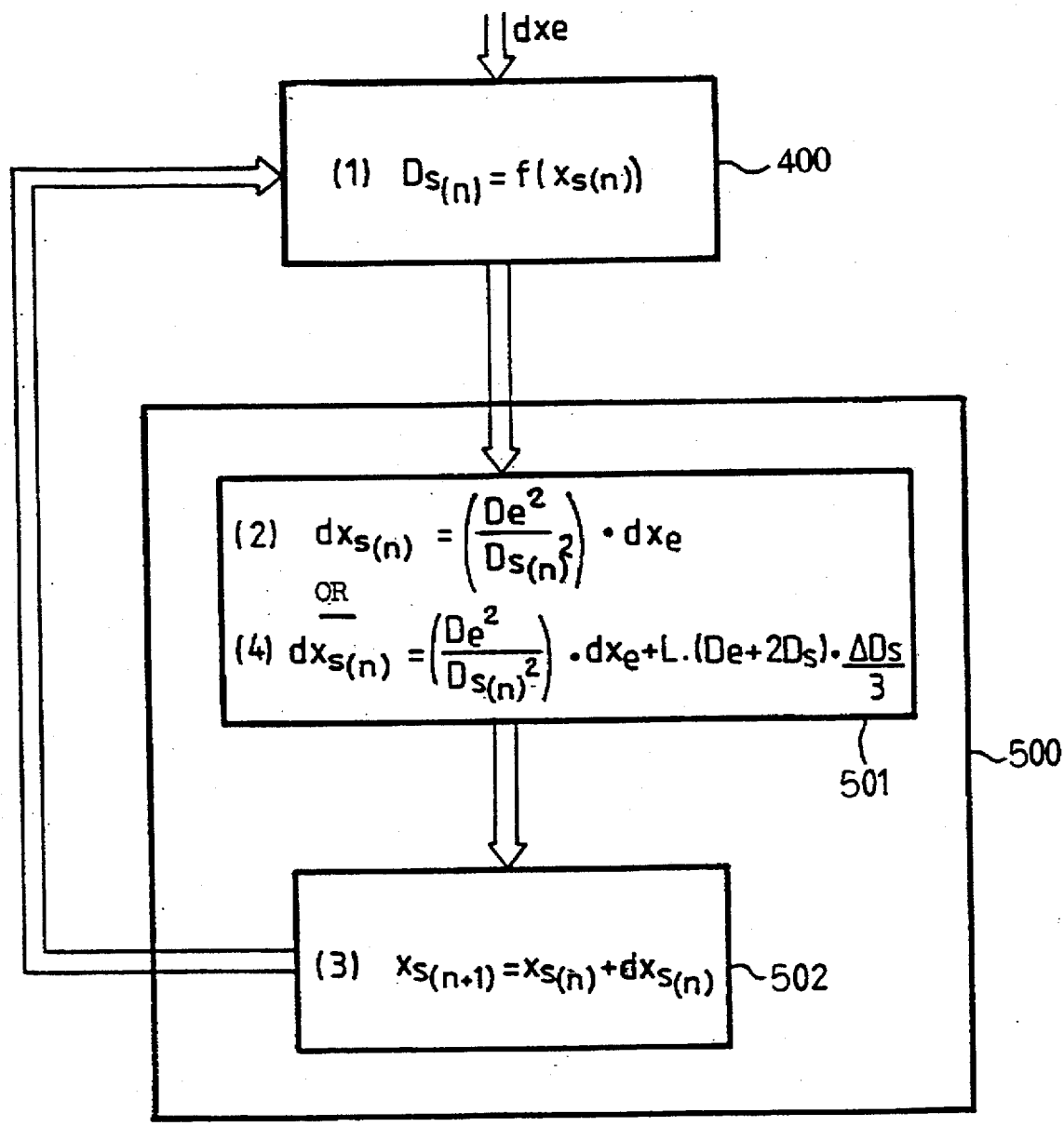

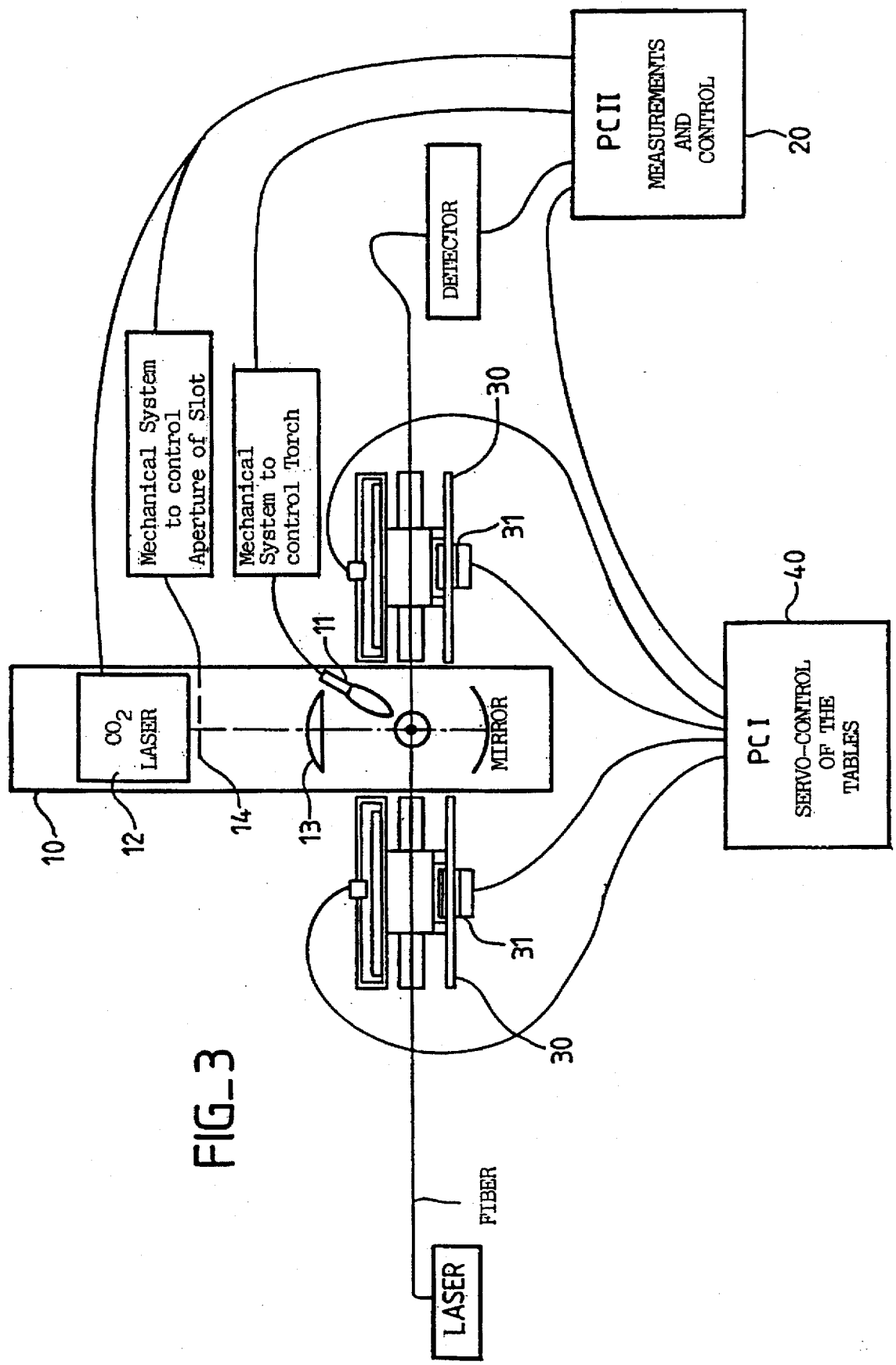
FIG_3

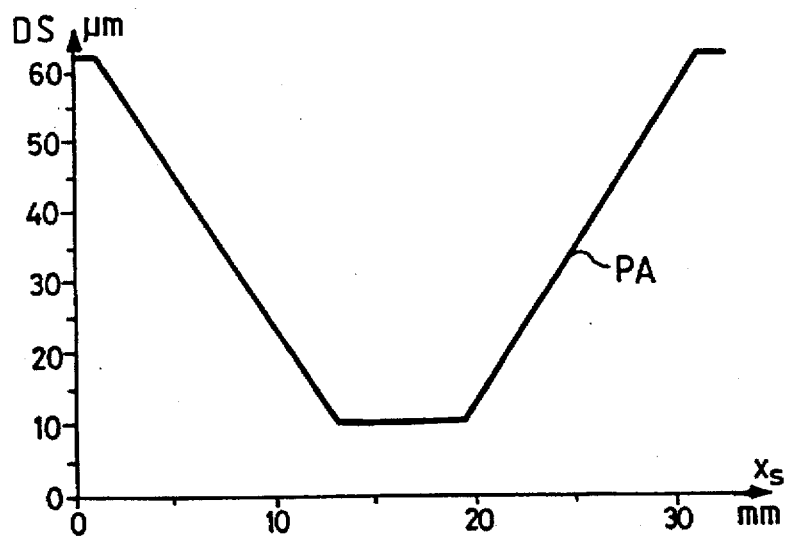
FIG._4A
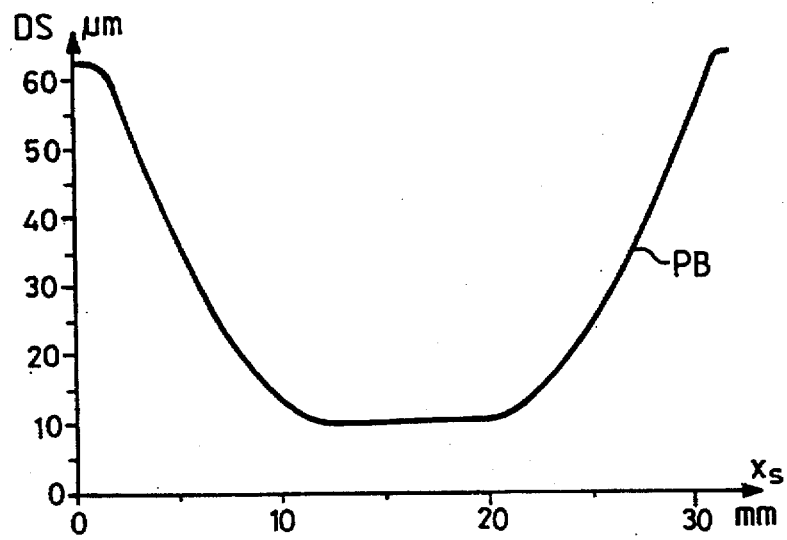
FIG._4B
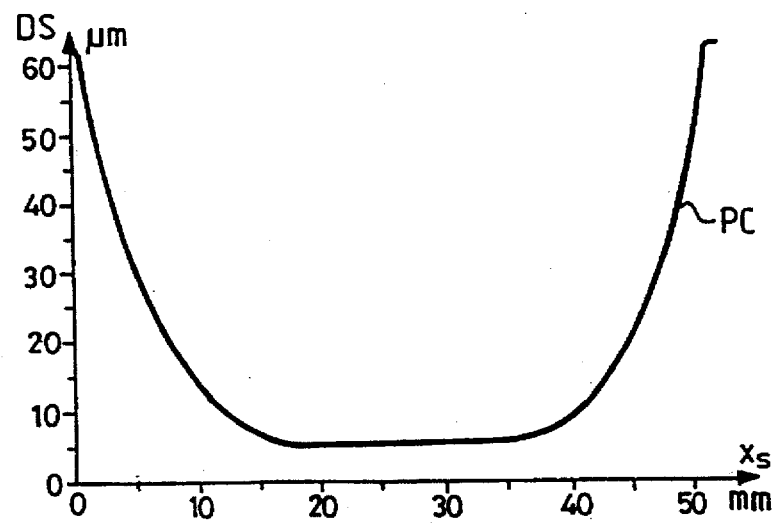
FIG._4C

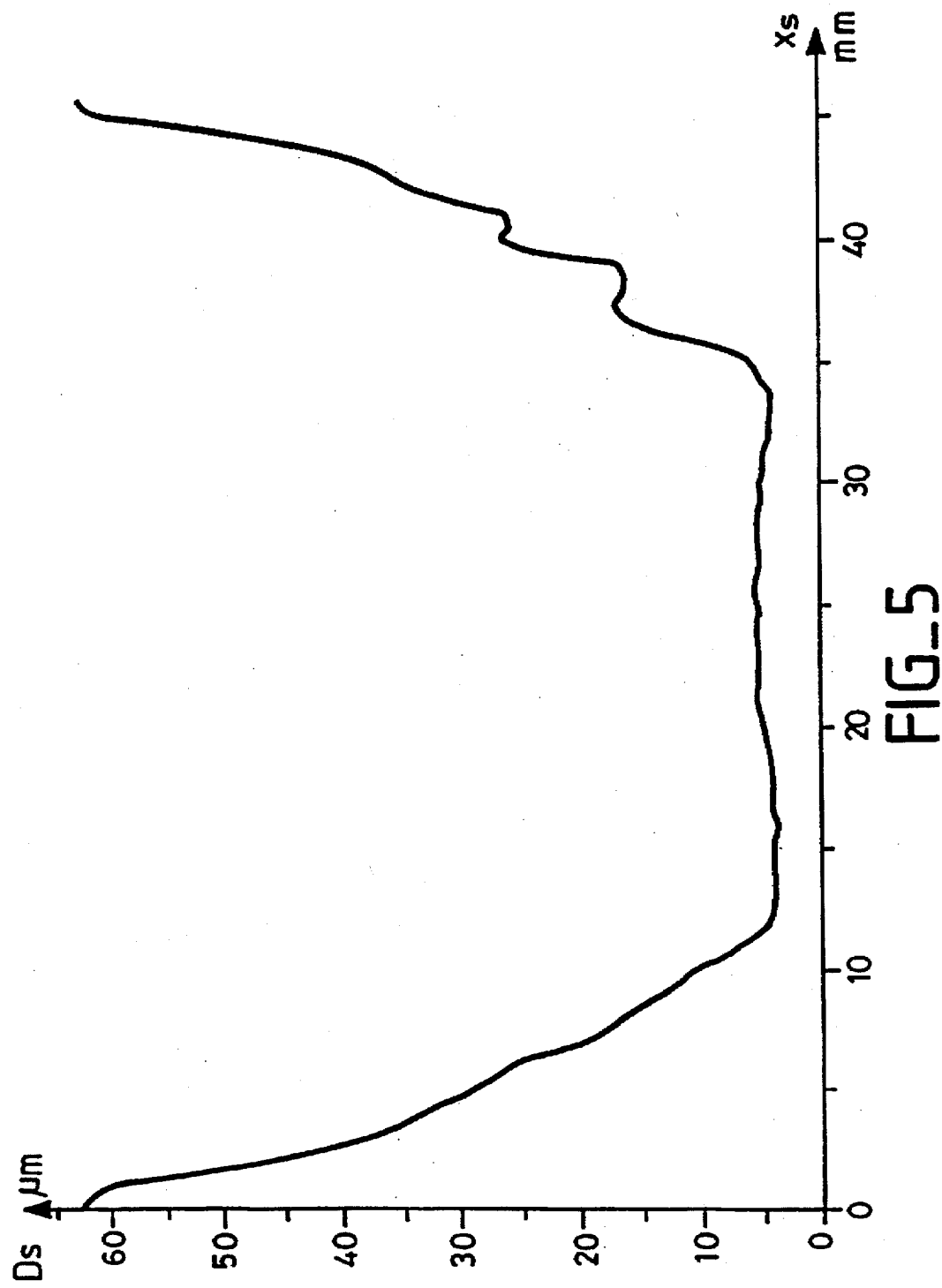
FIG_5

METHOD FOR THE MANUFACTURE OF WIRES STRETCHED ACCORDING TO A PREDETERMINED PROFILE

BACKGROUND OF THE INVENTION

1. Field of the Invention

The invention relates to a method for making optic fibers stretched or tensioned according to a predetermined profile to be obtained.

This method may be promising in certain applications and especially for guided optics using fibers. The invention can be applied especially in the case of monomode fibers.

The method according to the invention can be applied to the manufacture of devices such as filters by inter-mode interference, fused and stretched couplers or surface absorption sensors. These devices are generally constituted by three sections. The first section, made of stretched fibers, enables the coupling of the power of the mode of the fiber with a second part having a diameter smaller than that of the first part, where one or more modes travel at different speeds. The third section is another tapered section used to return to the original fiber diameter. However, the invention can also be applied to modifying the diameter of the mode guided by the fiber, the useful part then being the first section only.

2. Description of the Prior Art

A great many methods for the manufacture of stretched fibers have already been implemented in order to make either couplers or modal filters, but it has not been possible with any of them to obtain very precise stretching according to a desired profile. These methods have used means of minimizing the optical losses of the devices and means to prevent the critical gradients that lead to couplings towards high-order modes that cannot be recovered at the exit from the device.

However, in the article published by Kenny R. P., Birks T. A. and Oakley K. P., "Control Of Optical Fiber Taper Shape", Electron. Lett., 1991, 27, pp. 1654–1656, a description is given of a method for the controlled stretching of optical fibers.

This system starts with a model. This model is obtained by a relationship f of variation of the radius r of the fiber as a function of its elongation x such that $r=f(x)$. The fiber is heated over a sufficient length L, and a pull is exerted on each end to bring about the elongation x desired so that the value of the radius r of the fiber is in accordance with the relationship of variation $r=f(x)$ defining the model chosen.

This document further describes a general application of the model in which the elongation x gives rise to a variation of the fixed length L since the fiber has been elongated. Since the fiber is static, the variation in length L can only be located in space. It can in no way be located in time. The fixed length L is also highly dependent on the width of the flame of the torch used or on the shifting of the torch if it is mobile.

In any case, the stretching is highly limited over a unchanging length of fiber since there is no addition of matter during the stretching operation. Furthermore, this technique calls for the use of a pre-established model.

This technique is a complex one and furthermore cannot be used to get all the precision required for the profile obtained. The present invention makes it possible to overcome this problem.

SUMMARY OF THE INVENTION

An object of the invention is a method for the controlled stretching of one or more optical fibers in a desired profile complying with a relationship f of variation such that $D_s=f(x_s)$ in which $x_s$ represents the variable positions in time of the fiber at exit from the heating chamber. Thus, the desired profile is obtained with high precision without any limit on the length of fiber used.

More particularly, an object of the invention is a method for the controlled stretching of one or more optical fibers, chiefly comprising the following steps:

- dictating a speed $V_e=dx_e/dt$ of flow of the fiber entering the heating chamber,
- choosing a relationship f of variation of the diameter $D_s$ of the fiber at exit from the heating chamber such that $D_s=f(x_s)$ in which $x_s$ represents the positions, variable in time, of a point of the fiber during exit from the heating chamber,
- carrying out successive stretching operations on the fiber to modify, each time, the diameter $D_s$ of the fiber during exit from the heating chamber so as to follow the profile defined by the relationship f of variation.

According to a preferred embodiment, to perform the successive stretching operations on the fiber to modify, each time, the diameter $D_s$ of the fiber and follow the profile defined by the relationship f of variation,

- a first value of the diameter $D_s$ of the fiber at exit from the heating chamber is determined, on the basis of the established relationship f, as a function of the position $x_s$ of the point on the fiber during exit from the heating chamber,
- the shift $dx_s$ is determined, to obtain a stretching of the fiber at exit from the heating chamber corresponding to this value, on the basis of the value of the speed $dx_e$ of flow of the fiber entering the heating chamber and the previously computed value of the diameter $D_s$,
- a new position $x_s$ of the point on the fiber during exit from the heating chamber is determined by increasing the value of the previously computed shift $dx_s$,
- the operations up to the obtaining of the desired profile are reiterated.

An object of the invention is also a device for the implementation of the method comprising a heating means and means for shifting the fiber controlled by a first computer that servo-controls the position of each of these shifting means on the basis of data elements given by a second computer which has a program to carry out the steps of the method. The heating means comprises a standard torch and a laser source.

Hereinafter, only one fiber shall be described in order to simplify the description. However, the method can be applied to a set having more than one fiber.

BRIEF DESCRIPTION OF THE DRAWINGS

Other features and advantages of the invention shall appear from the following description, given by way of an illustrative and non-restrictive example, with reference to the appended figures of which:

FIG. 1 shows the steps of the method according to the invention,

FIG. 2 shows the steps enabling the computation of the shift $dx_s$,

FIG. 3 shows a diagram of a preferred device for the implementation of the invention, FIGS. 4A–4C exemplify different profiles obtained after the implementation of the method, FIG. 5 shows a profile of a tapered fiber with the appearance of a state of instability where the value of the diameter undergoes swings and no longer follows the $f(x_s)$ relationship.

MORE DETAILED DESCRIPTION

The method is performed in several steps which shall be described in FIG. 1. An object of a first step of the method 100 is to lay down or designate a speed $V_e$ of flow of the fiber at entry into an heating chamber 10 as seen in FIG. 3 and described in greater detail below. The speed $V_e$ may be written in the form of a relationship such as $V_e = dx_e/dt$ from which $dx_e$ is deduced. It is possible to choose a simple relationship of progress of the speed of entry of the fiber such as for example:

$$dx_e = \text{constant, or } dx_e = a + b.D_s.$$

In a second step 200, depending on the profile to be obtained, a relationship f of variation of the diameter $D_s$ of the fiber at exit from the heating chamber is chosen as a function of the positions $x_s$, which are variable in time, of a point on the fiber chosen at exit of that point from the heating chamber such that: $D_s = f(x_s)$ (1).

The profiles to be obtained depend on the devices to be made. To make modal filters for example, it is necessary initially to stretch the fiber in a fairly steep gradient to prompt inter-mode coupling. It is possible, in this case, to use a linear relationship of variation. The gradient is then reduced in order to attenuate the parasitic couplings. It is then preferable to use a parabolic relationship of variation.

More generally, it is possible to choose different relationships of variation that will be applied one after the other over determined lengths of fiber. Hereinafter, examples of linear or parabolic profiles or of combinations of linear and parabolic profiles shall be given. But these are only illustrative examples. Other profiles described by a relationship f or relationships f and g of variation may be obtained for other applications. Thus, for example, exponential profiles, or profiles described by one or more derivable polynomials of any kind may be obtained.

Finally, in a last step 300, successive stretching operations are performed for the modification, each time, of the diameter $D_s$ of the fiber at exit from the heating chamber and to follow the relationship f of variation.

The shifts $dx_s$ of the fiber at exit from the heating chamber generating these stretching processes are computed in several steps illustrated in FIG. 2.

To compute these shifts $dx_s$, the relationship of variation $D_s = f(x_s)$ is used in step 400 to determine a first value of the diameter $D_{s(n)}$ of the fiber at exit from the heating chamber as a function of the first position $x_{s(n)}$ of the designated point on the fiber at exit from the heating chamber.

Then, the shift $dx_{s(n)}$ is determined in step 500 to obtain a stretching of the fiber at exit from the heating chamber corresponding to this value. To find the relationship enabling the computation of the value of the shift $dx_{s(n)}$, the operation starts with the relationship establishing the equality of the volumes of incoming and outgoing material namely: $D_e^2.V_e = D_s^2.V_s$, where $V_e$ is the speed of the fiber at entry into the heating chamber and $V_s$ is the speed of the fiber at exit from the heating chamber. Now, the speeds $V_e$ and $V_s$ may also be written as follows:

$V_e = dx_e/dt$ and $V_s = dx_s/dt$. These equations lead, at the step 501, to a relationship of $dx_s$ as a function of the speed $dx_e$ of flow of the fiber at entry into the heating chamber and of the diameter $D_s$ of the fiber at exit from the heating chamber which is the following:

$$dx_s = (D_e^2/D_s^2).dx_e \quad (2)$$

where
$D_e$ = diameter of the fiber at entry into the heating chamber,
$D_s$ = diameter of the fiber at exit from the heating chamber
$dx_e$ = speed of the fiber at entry into the heating chamber.

Then a new position $x_{s(n+1)}$ of the designated point on the fiber at exit from the heating chamber is determined in step 502 by increasing the value of the previously computed shift $dx_{s(n)}$, according to the relationship:

$$x_{s(n+1)} = x_{s(n)} + dx_{s(n)} \quad (3)$$

The operations are reiterated successively by applying the relationships (1), (2) and (3) until the desired profile is obtained.

In the case of a linear profile, the operations are reiterated, for example until a fixed threshold value is obtained for the diameter $D_s$. In the case of a parabolic profile, the operations are reiterated for example until the initial diameter ($D_s = D_e$) of the fiber is obtained.

The method that has just been described could be applied if the variations in the volume of the zone of fused fiber should be negligible as compared with the volume of outgoing material.

If not, these variations in volume will be preferably taken into account.

To take account of these variations, this fused zone will be considered for example to be a truncated cone. The computation of the variation in volume as a function of that of the outgoing diameter gives the following expression:

$\Delta V = (\pi/12).L.(D_e + 2D_s)\Delta D_s$ where L is the height of the truncated cone, namely the effective width of the heating chamber. This expression leads to a new relationship of $dx_s$:

$$dx_s = (D_e^2/D_s^2).dx_e + L.(D_e + 2D_s)\Delta D_s/3 \quad (4)$$

which replaces the relationship (2) in the preceding iteration 501. The value $\Delta D_s$, which is the variation of the diameter at exit between each iteration, is obtained from the relationship (1). The variations of the height L of the truncated cone as a function of $D_s$ may also be taken into account as well as all other approximate forms of the zone of fused fiber.

It is observed that, in this case, when the ratio $D_e/D_s$ reaches a maximum threshold, a state of instability may occur, as shown in FIG. 5, where value of the diameter swings and no longer follows the $f(x_s)$ relationship. In this case, the tapering is done in two steps. In a first step, a pull is exerted on the fiber until an intermediate value of diameter is reached and the pulling is continued over a determined length so as to obtain a cylinder. In a second step, the starting point of the cylinder thus created is returned to, and the tapering is ended according to the chosen profile.

A description shall now be given of a preferred embodiment of a device for implementing the method. The diagram of this device is shown in FIG. 3. It has a means for heating the fibers, called a heating chamber 10, and means 30 for shifting the fibers with respect to this heating chamber.

The heating chamber 10 is formed by two elements. Firstly, there is a standard micro-torch 11 working preferably with butane, oxygen or nitrogen which is added to adjust the temperature of the flame. Secondly, there is a laser source 12. This laser source 12 preferably comprises a $CO_2$ laser. The torch enables the fiber to be heated until its softening point. This makes it possible, before tapering the fiber, to release the stresses and deformation if any due to the method of fixing the fibers. The $CO_2$ laser enables a minimum length of fiber to be taken to the melting temperature. A means of focusing this laser source 12 is preferably constituted by a cylindrical lens 13 associated with a spherical mirror. The laser beam gets divided on either side of the fiber, when it meets it, on the side of the fiber opposite the laser source with respect to the axis of flow of the fiber. The spherical mirror enables the radiation of this laser beam to be refocused.

An eye-glass, not shown in the figure, is used to identify the temperature of the fiber by its brightness. This measurement is used to regulate the power given by the $CO_2$ laser by means of a slot 4 whose aperture is servo-controlled by a control mechanical system which itself is controlled by the PCII computer 20.

In another variant, another control mechanical system, controlled by the PCII computer 20, servo-controls the gas flow-rate of the torch to modify the flame width.

The combined use of these two heating means makes it possible to arrive at a minimum efficient width of heating chamber while at the same time reducing, to the extent possible, the effect of blasts due to the torch. It also enables the creation of a hottest point in the heating chamber. It is possible to determine the starting point, on the axis, of the shifts of the fiber on the basis of the hottest point of the heating chamber thus created.

The assembly formed by the torch plus the optical focusing system of the laser can be moved perpendicularly to the axis of the fiber. Its positioning and removal at the start and end of the stretching process are carried out by the PCII computer 20 which has a shifting command and a command for turning on the laser.

The shifting of the fiber is obtained by shifting means preferably comprising two air cushion tables 30 so as to reduce the effect of friction. The position of each table is identified, by means commonly used on machine tools, with a resolution of 0.1 μm. The movements of the table are provided by a linear motor 31 whose winding is fixed and whose mount is movable. This prevents mechanical vibrations and enables the movable mount to have no electrical connection liable to hamper its movements. The two motors are driven by a first PCI computer 40 which servo-controls the position of each table on the basis of data elements given by a second PCII computer 20 that has a program for the performance of the steps of the method. All of the positions of the tables may be placed in the random-access memory of the computer before the stretching of the fiber by means of a computation program using the previously described relationships (1), (2), (3) and (4).

The tensile force applied to the fiber may furthermore be measured by this same PCII computer 20. It is initialized at the outset so as to take account of the expansion of the fiber when it is placed in the heating chamber.

The exchanges between computers and the measurements are made by means of input/output ports without any exchange protocol so as not to slow down the manufacture of stretched fibers by the devices.

According to another preferred variant of the invention, a laser may be fixed at the end of the fiber in order to inject light pulses into the fiber and a detector may be fixed, connected to the PCII computer (20), at the other end of the fiber to check the phenomena that exist at exit from the fiber during the stretching operation.

By means of this method for the manufacture of stretched fibers, it is possible to make all sorts of profiles according to the devices to be obtained.

In this description, it has been chosen to give examples of some profiles. These examples, which are illustrative but not restrictive, are shown together in FIGS. 4A–4C.

A curve PA in FIG. 4A shows a linear profile obtained by using a linear equation for the relationship f of variation.

The curve PB in FIG. 4B represents a parabolic profile obtained by using a parabolic equation for the relationship f of variation.

The curve PC in FIG. 4C shows a profile for which there is a combination of different relationships applied successively to specified lengths of fiber. The profile is linear over a fiber portion and corresponds to a linear equation chosen for the relationship f of variation since the profile is parabolic on another fiber portion and corresponds to a parabolic equation chosen for the relationship g of variation, and finally the profile is linear on a third fiber portion and corresponds to a linear equation chosen for the relationship f of variation.

What is claimed is:

1. A method for the controlled stretching of one or more optic fibers as the fibers flow through a heating chamber, comprising the following steps:

dictating a speed $V_e = dx_e/dt$ of flow of the fiber entering the heating chamber, choosing a relationship f of variation of the diameter $D_s$ of the fiber such that $D_s = f(x_s)$ in which $x_s$ represents the positions, variable in time, of a point on the fiber during exit from the heating chamber, carrying out successive stretching operations on the fiber to modify, during each said stretching operation, the diameter $D_s$ of the fiber during exit from the heating chamber so as to follow the profile defined by the relationship f of variation.

2. A method for the controlled stretching of one or more optic fibers comprising the following steps:

dictating a speed $V_e = dx_e/dt$ of flow of the fiber entering the heating chamber, choosing a relationship f of variation of the diameter $D_s$ of the fiber such that $D_s = f(x_s)$ in which $x_s$ represents the positions, variable in time, of a point on the fiber during exit from the heating chamber, carrying out successive stretching operations on the fiber to modify, during each said stretching operation, the diameter $D_s$ of the fiber during exit from the heating chamber so as to follow the profile defined by the relationship f of variation, wherein, to perform the successive stretching operations on the fiber so as to modify, during each said stretching operation, the diameter $D_s$ of the fiber and follow the profile defined by the relationship f of variation, a first value of the diameter $D_s$ of the fiber during exit from the heating chamber is determined, on the basis of the relationship f, as a function of the position $x_s$ of the point on the fiber during exit from the heating chamber, a shift $dx_s$ in position $x_s$ of the point on the fiber is determined to obtain a stretching of the fiber during exit from the heating chamber corresponding to the first value, on the basis of the value of the speed $dx_e$ of flow of the fiber at entry into the heating chamber and of the previously computed value of the diameter $D_s$, a new position $x_s$ of the point on the fiber during exit from the heating chamber is determined by increasing the value of the previously computed shift $dx_s$, the operations up to the obtaining of the desired profile are reiterated.

3. A method for the controlled stretching of one or more optical fibers according to claim 2, wherein the relationship enabling the computation of the value of the shift $dx_s$ is the following:

$$dx_s = (D_e^2/D_s^2) \cdot dx_e.$$

4. A method for the controlled stretching of one or more optical fibers according to claim 2, wherein the relationship enabling the computation of the value of the shift $dx_s$ is the following:

$$dx_s = (D_e^2/D_s^2).dx_e + L.(D_e + 2D_s)\Delta D_s/3.$$

5. A method for the controlled stretching of one or more optic fibers according to claim 1, wherein a relationship f of variation is chosen so as to apply it to a first length of fiber, and another relationship g of variation is chosen so as to apply it to a second length of fiber.

6. A method for the controlled stretching of one of more optic fibers according to claim 5, wherein the relationship f or the relationships f and g of variation are equations of curves that are derivable in art interval of computation of the diameter of the fiber.

7. A method for the controlled stretching of one or more optic fibers according to claim 5, wherein the relationship f of variation is a linear equation and the relationship g of variation is a parabolic equation.

8. A method for the controlled stretching of one or more optic fibers according to claim 1, wherein the starting point, on the axis, of shifts of the point on the fiber is determined on the basis of the hottest point of the heating chamber.

9. A device for the controlled stretching of one or more optic fibers, said device comprising: a heating assembly, means for shifting the fiber, a first computer controlling the means for shifting, and a second computer, wherein said first computer servo-controls the position of the means for shifting on the basis of data elements given by the second computer, the second computer including a means for dictating a speed $V_e = dx_e/dt$ of flow of the fiber entering the heating assembly, means for choosing a relationship f of variation of the diameter $D_s$ of the fiber such that $D_s = f(x_s)$ in which $x_s$ represents the positions, variable in time, of a point on the fiber during exit from the heating assembly and means for carrying out successive stretching operations on the fiber to modify, during each said stretching operation, the diameter $D_s$ of the fiber during exit from the heating assembly so as to follow the profile defined by the relationship f of variation.

10. A device according to claim 9, wherein the heating assembly is a heating chamber in which is disposed a torch and a laser source.

11. A device according to claim 10, wherein the laser source is a $CO_2$ laser.

12. A device according to claim 9, wherein said second computer also includes means for determining a first value of the diameter $D_s$ of the fiber during exit from the heating assembly, said first value being determined on the basis of the relationship f as a function of the position $x_s$ of the point on the fiber during exit from the heating assembly, means for determining a shift $dx_s$ in position of the point on the fiber to obtain a stretching of the fiber during exit from the heating assembly corresponding to the first value, on the basis of the value of the speed $dx_e$ of flow of the fiber at entry into the heating assembly and of the previously computed value of the diameter $D_s$, means for determining a new position $x_s$ of the point on the fiber during exit from the heating assembly by increasing the value of the previously computed shift $dx_s$, and means for reiterating the operations up to the obtaining of the desired profile.

* * * * *